(No Model.)
2 Sheets—Sheet 1.
H. F. BRINTON.
Machine for Cooking and Drying Food and Grain.
No. 230,525. Patented July 27, 1880.
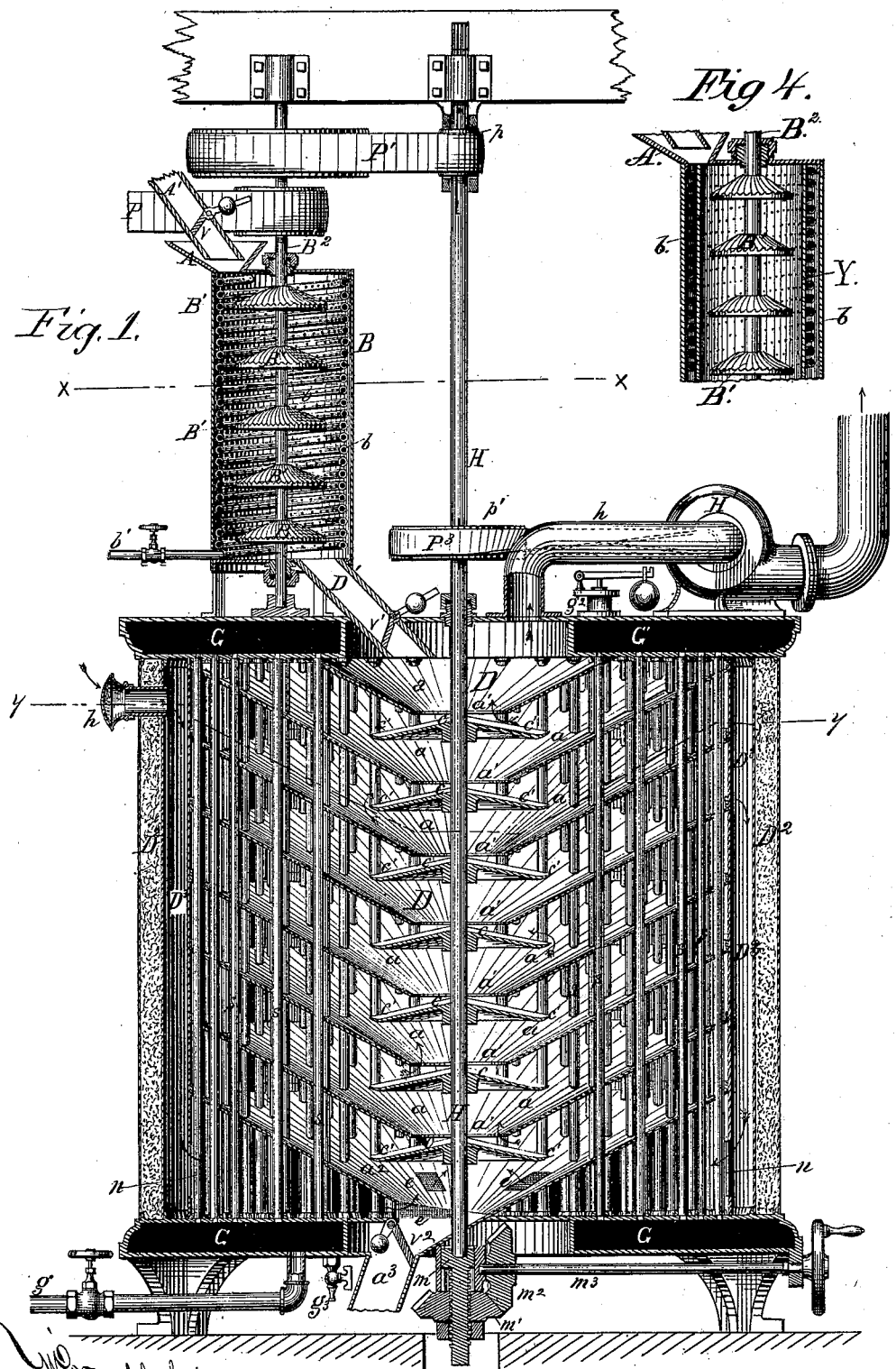

(No Model.) 2 Sheets—Sheet 2.
H. F. BRINTON.
Machine for Cooking and Drying Food and Grain.
No. 230,525. Patented July 27, 1880.
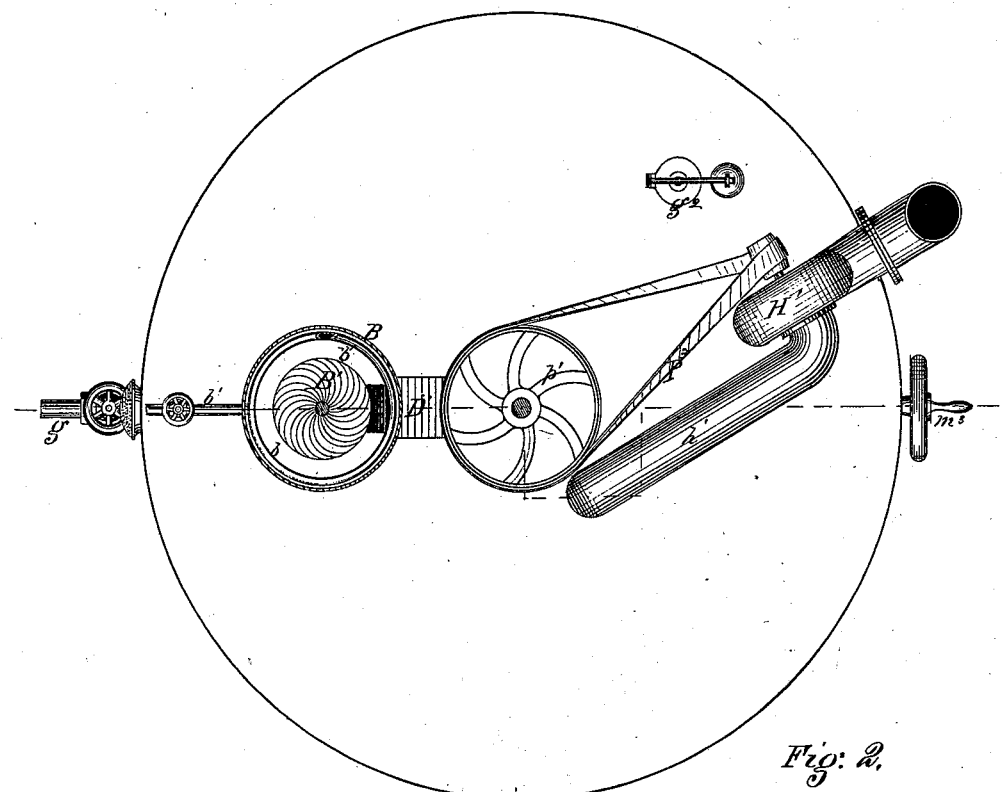
Fig: 2.
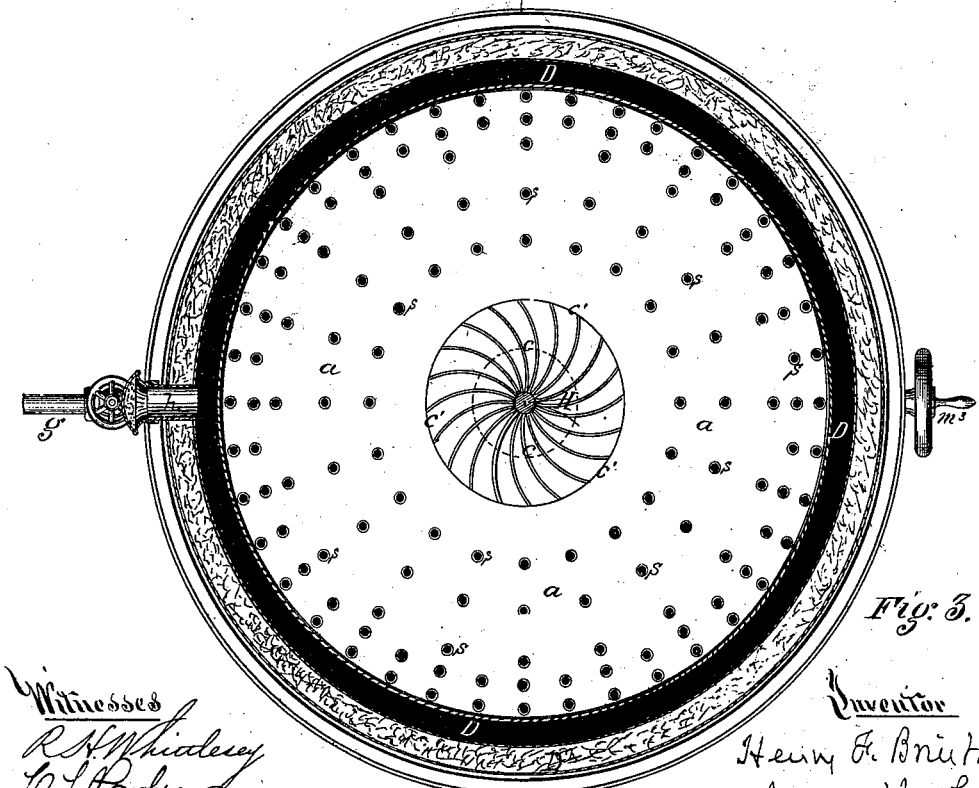
Fig: 3.
Witnesses
R. H. Whidsley
C. L. Parker
Inventor
Henry F. Brinton,
By Attorney George H. Christy

UNITED STATES PATENT OFFICE.

HENRY F. BRINTON, OF NORTH HUNTINGTON TOWNSHIP, (LARIMER'S STATION P. O.,) WESTMORELAND COUNTY, PENNSYLVANIA.

MACHINE FOR COOKING AND DRYING FOOD AND GRAIN.

SPECIFICATION forming part of Letters Patent No. 230,525, dated July 27, 1880.

Application filed April 17, 1880. (No model.)

*To all whom it may concern:*

Be it known that I, HENRY F. BRINTON, of North Huntington Township, (Larimer's Station P. O.,) county of Westmoreland, State of Pennsylvania, have invented or discovered a new and useful Improvement in Machines for Cooking and Drying Food and Grain; and I do hereby declare the following to be a full, clear, concise, and exact description thereof, reference being had to the accompanying drawings, making a part of this specification, in which—like letters indicating like parts—

Figure 1, Sheet 1, is a vertical sectional elevation of my improved apparatus. Fig. 2, Sheet 2, is a top or plan view of a horizontal section through the line $x\ x$, Fig. 1; and Fig. 3 is a horizontal sectional view in the plane of the line $y\ y$, Fig. 1.

My invention relates to an improved machine for cooking and drying grain and other coarse food for live stock, particularly domestic animals, by which the entire work of cooking, drying, and discharging the food in condition for immediate use, or for use from day to day without liability to fermentation, may be done expeditiously and well, and at a single operation.

The superiority of cooked food for feeding purposes is so well known to stock-raisers generally that it need not here be set forth.

The grain or other food to be cooked may be fed from a bin overhead through a chute, A', or otherwise, into a hopper, A, whence it passes into the cooking-chamber B, which is preferably of cylindrical form, and is lined by a steam-coil, $b$, such coil being provided with numerous perforations on its inner side, as shown, and sufficient in number and size for the supply of the steam to the contents of the chamber, so as properly to cook such contents to the desired extent.

The steam is supplied by a pipe, $b'$, leading from any suitable steam-generator.

Inside the chamber is an upright spindle, $B^2$, on which is a series of stirrers or mixers, B', two, three, or more. These are slightly conical in shape, and are a little less in diameter than the inside diameter of the steam-pipe lining, so that while the feed shall, as it goes down in the chamber, be brought into close proximity to one or more of the perforated coils, it shall also have room to pass downward outside the stirrers without danger of clogging.

The upper faces of the stirrers are provided with radial or other desired arrangement of grooves, such as shall tend to turn the food over and over, and subject all parts of it to the action of the steam, and shall also tend to feed it outward to or toward the periphery of the stirrers. From the bottom of the cooking-chamber a chute, D', leads to the drying-chamber D, in which I make use of steam and hot air for drying purposes. This chamber is surrounded by an annular jacket, $D^2$, of asbestus, or other known material which is a poor conductor of heat. Inside this, and exterior to the drying-chamber D, is an annular chamber, $D^3$, in which the air is to be heated, and the chamber is made with a double top and bottom, so as to give steam-chambers G G'. Inside the chamber D, and projecting from its inside walls inwardly toward its center, is a series of concave or hopper-shaped shelves, $a$, but which are open at the center, as shown at $a'$. On a vertical spindle, H, which extends up through the middle of the chamber, I arrange a series of disks, $c$, which are grooved on their upper faces, in like manner as the stirrers B' in the cooking-chamber B, and which taper downward on their upper faces or sides, but are upwardly curved at their peripheries, as at $c'$, the diameters of such disks being a little greater than the diameters of the openings $a'$ of the shelves $a$; but the lower shelf, $a^2$, however, is closed down at its center, so as to form a complete hopper, and it leads into a chute, $a^3$, through which the contents of the chamber D may, after being properly dried, be discharged into any suitable receptacle, ready for use as may be desired.

Connecting the steam-chambers G G' is a series of steam-pipes, $s$, in any desired number, but preferably somewhat numerous, so that while the downward flow of the food or grain will not be materially obstructed, the inside of the chamber will be raised to a good drying temperature. These pipes should be distributed entirely around the chamber D, passing through the shelves $a$, as shown.

Steam is admitted by a pipe, $g$, into the lower steam-chamber, G, and passing thus, by the pipes $s$, is discharged into the chamber G', and the residue, if any remains uncondensed, may escape through the pipe $g^2$, closed as against ordinary pressure by a weighted check or safety-valve. The water of condensation may be carried off through a drip-valve, $g^3$. The heat radiated from the pipes $s$ will raise the inside of the drying-chamber to a high temperature.

The lower hopper-shelf, $a^2$, has in it one, two, or more air-screens, $e$, having a fine mesh, such that air may freely pass through, while the grain or food within will be directed down or out of the discharge-chute.

In order, now, to get rid of the vapor or damp atmosphere produced inside the drying-chamber D, as a result of the steam-drying operation, and also to perfect the drying, I introduce air through the port $h$ into the air-space $D^3$, in which space the air will be heated somewhat by heat radiated from the chamber D.

By the use of an exhaust fan or blower, arranged in any suitable way, as at H', communicating by a pipe, $h'$, with the inside of the drying-chamber D, I exhaust the damp air from such chamber, drawing air from the inside spaces, $D^3$, through one or more ports, $n$, arranged in the case of the chamber D beneath the lower hopper-shelf, $a^2$, whence the air passes through the screens $e$ up inside, and passing up through the drying-chamber D, aids in drying the contents and draws off all vapors and dampness.

In operation, the food or grain admitted through the chute A' is discharged into the chamber D, either on the upper shelf, $a$, or onto the upper disk, or falls from the former onto the latter. These disks $c$ are caused to revolve at a comparatively high speed, and by their centrifugal action, in connection with their grooved upright faces and the curve of their peripheries, as at $c'$, throw the food or grain outward against or among the pipes $s$, so that it will be well heated, and consequently, to a corresponding extent, dried. The food or grain is deposited on the next shelves $a$, and is discharged thence on the next disk $c$, where that operation is repeated, and so on through the entire series until the discharge-spout is reached; but as different kinds of food or grain require greater or less room to pass from $a$ to $c$, or from $c$ to $a$, on their downward progress, I provide for vertical adjustment of the disks $c$ up or down by means of an adjustable step, $m$, which supports the lower end of the spindle H, and this step is adjusted up or down in any suitable way, as by a nut, $m'$, through which the stem of the step passes, and which latter is worked by the pinion $m^2$ and the crank-shaft $m^3$.

The valves shown at $v$, $v'$, and $v^2$ may be of any suitable construction or arrangement with reference to rapidity of feed as may be desired, or each valve-stem may be weighted, as shown, so as to be kept in a closed position, except as against a predetermined operative pressure. In this respect the skill of the mechanic may be employed to vary the construction of the devices.

The apparatus may be driven in any suitable way, and, purely for convenience, I have shown the driving-belt P passing over a pulley on the shaft $B^2$, so as to operate the stirrers in the cooking-chamber with a predetermined slow motion; also a belt, P', for driving the shaft H and disks $c$ with a predetermined rapid motion, and a belt, $P^3$, for communicating motion to the exhaust-fan.

The pulley $p$, on the upper end of the spindle, I connect with the spindle by a feather and groove, and also the lower pulley, $p'$, so that they will not be materially affected in operation by the vertical adjustment of the spindle H.

In so far as relates to the use of the drier, it may be employed for drying damp or moist grain independent of the cooker, in which case grain should be fed in by the chute D' into the drying-chamber D, from which point the operation will be the same as already described.

If so desired, with reference to the free circulation of air, fine perforations or fine screens may be arranged at various points in each of the shelves $a$, so that the upward draft of air may be kept up through the drier D at points toward its periphery as well as at its center.

The air employed in the operation described may be heated, if so desired, before entering the port $h$, though I do not think it will be necessary. If found necessary a sheet-metal cylinder can be arranged inside the steam-coil $b$, around the cooking-chamber B, with numerous perforations through the same, so as to give the steam free access to the inside of the chamber, as illustrated at Y, Fig. 4, which figure shows, in vertical section, a portion of the cooking-chamber. This may be advantageously used where the material to be cooked is such as would be likely to lodge in between the pipes of the coil; also, the shelves $a$ may be made whole or in sections and of any suitable material.

Other modifications may be made or additional devices added, such as will come within the knowledge of the skilled mechanic, and will leave the operation substantially unaltered—as, for example, a blower to force air in at the port $h$ may be employed instead of an exhaust-fan to draw it out, as also other connecting-gear may be employed, instead of belts and pulleys, for giving to all parts of the apparatus a simultaneous motion.

I claim herein as my invention—

1. In combination with cooking-chamber B, lined within by perforated steam-coil $b$, a series of stirrers, B', each downwardly sloping and radially grooved on its upper face, substantially as set forth.

2. A drying apparatus, consisting of a chamber, D, having within a series of hopper-shaped shelves, $a$, open at the center, revolving disks $c$ beneath the openings of the shelves, steam-pipes $s$, distributed around the chamber and passing up through the shelves, a surrounding air-chamber, $D^3$, for heating air, and an air exhaust or blower for causing a current or draft of warm or heated air to pass through the chamber, substantially as set forth.

3. In a drying apparatus, a series of disks, $c$, grooved on their upper faces, tapering downward to an upwardly-curved periphery, $c'$, in combination with intermediate hopper-shaped shelves, $a$, a bottom hopper-shelf, $a^2$, leading into a discharge-chute, $a^3$, screens $e$, and an air blower or exhaust, substantially as set forth.

4. In a food and grain drier, the steam-chambers G G′ and connecting-pipes $s$, in combination with shelves $a$, disks $c$, and blower or exhaust H′, substantially as set forth.

In testimony whereof I have hereunto set my hand.

HENRY F. BRINTON.

Witnesses:
  R. H. WHITTLESEY,
  C. S. PARKER.